US008087992B2

(12) United States Patent
Post

(10) Patent No.: US 8,087,992 B2
(45) Date of Patent: Jan. 3, 2012

(54) SECONDARY PAY LINE INDICATOR IN A WAGERING GAME

(75) Inventor: Peter John Post, Moncton (CA)

(73) Assignee: Spielo Manufacturing ULC, Moncton, New Brunswick (CA)

( * ) Notice: Subject to any disclaimer, the term of this patent is extended or adjusted under 35 U.S.C. 154(b) by 1032 days.

(21) Appl. No.: 11/636,196

(22) Filed: Dec. 8, 2006

(65) Prior Publication Data

US 2008/0139286 A1 Jun. 12, 2008

(51) Int. Cl.
*G06F 17/00* (2006.01)

(52) U.S. Cl. ........................................................ 463/20

(58) Field of Classification Search .............. 463/16–25, 463/31, 32, 46; 273/138.2, 143 R
See application file for complete search history.

(56) References Cited

U.S. PATENT DOCUMENTS

| | | | | |
|---|---|---|---|---|
| 7,431,645 | B2 * | 10/2008 | Han et al. | 463/16 |
| 7,594,852 | B2 * | 9/2009 | Rasmussen | 463/20 |
| 7,618,315 | B2 * | 11/2009 | Thomas et al. | 463/20 |
| 2005/0261055 | A1 * | 11/2005 | Casey et al. | 463/20 |
| 2006/0252496 | A1 * | 11/2006 | Rasmussen | 463/20 |
| 2007/0060245 | A1 | 3/2007 | Veenker | 463/16 |
| 2007/0167238 | A1 * | 7/2007 | Gatto et al. | 463/42 |
| 2007/0243934 | A1 * | 10/2007 | Little et al. | 463/40 |
| 2008/0045300 | A1 * | 2/2008 | Quayle et al. | 463/18 |
| 2009/0069063 | A1 * | 3/2009 | Thomas et al. | 463/16 |
| 2009/0075717 | A1 * | 3/2009 | Jaffe | 463/20 |
| 2009/0137309 | A1 * | 5/2009 | Thomas | 463/20 |
| 2009/0280890 | A1 * | 11/2009 | Jaffe | 463/20 |

OTHER PUBLICATIONS

GTECH Corporation, "Skydiver", 2004.

* cited by examiner

*Primary Examiner* — Ronald Laneau
(74) *Attorney, Agent, or Firm* — Sullivan & Worcester LLP; Christopher T. McWhinney

(57) ABSTRACT

A system and method are provided for facilitating play of a wagering game by a player. The system may include a primary display configured to display an arrangement of a set of symbols indicating an outcome and a winning pay line in the wagering game to the player. The system may include a secondary display, separate from the primary display, the secondary display configured to display a representation of the winning pay line. The system may include a processor in communication with the primary display and the secondary display. The processor may be configured to determine the arrangement of the set of symbols indicating the outcome, determine the winning pay line in the arrangement of the set of symbols, causing the primary display to display the arrangement of the set of symbols and the winning pay line, and causing the secondary display to display the representation of the winning pay line.

32 Claims, 10 Drawing Sheets

SECONDARY PAY LINE INDICATOR IN A WAGERING GAME

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

A mechanical slot machine is a type of wagering game, often offered in casinos or other locations in jurisdictions with legal gambling. Traditional slot machines are coin-operated machines with three or more reels, each reel including a plurality of symbols. The reels spin when a lever on the side of the machine is pulled. The machine accepts a wager from a player prior to spinning the reels. The machine typically pays out a prize based on a pattern of symbols depicted on the reels visible on the front of the machine when the reels stop spinning and a winning outcome is displayed.

A video slot machine replaces the reels of a mechanical slot machine with a video display, such as a CRT or LCD display. The display simulates the reels of a traditional slot machine by displaying a plurality of elements. Each element depicts a symbol and the elements may be animated to simulate spinning reels after a lever on the side of the machine is pulled. When the animation stops, a winning outcome may be displayed. For example, a video slot machine may be a kiosk in communication with a server, both located at a gambling premise such as a casino. Alternatively, video slot machine may be a personal computer in communication with the server over the Internet. Similar to a mechanical slot machine, a prize may be awarded to the player based on a pattern of symbols displayed on the video display after a winning outcome.

A video gaming machine is an automated kiosk or terminal with an input and an output configured to provide a video game to a player. The video gaming machine is in communication with a server over a network. The video gaming machine may be configured to provide wagering games to the player and allows the player to bet on the outcome of a video game. Wagering games may include video slots, video poker, video keno, video lottery, or other conventional wagering games. Video slot machines may be video gaming machines.

In slot machine games, both video and mechanical, prizes may be awarded to the player after the symbols are displayed to the player. A prize may be awarded if a quantity of symbols are displayed along a pay line, e.g., if at least a predetermined number of matching symbols are displayed along particular pay line. A pay line may include a set of elements adjacent to each other, e.g., in a horizontal line, on a diagonal, or in other predetermined patterns, according to the rules of the particular game. It is possible to have any quantity of pay lines in a slot game, but a large number of pay lines with high variability makes it difficult for the player to recognize when a winning outcome has occurred and what pay line contributed to the winning outcome. A winning pay line may be a pay line including elements that displays a predefined quantity of symbols.

DETAILED DESCRIPTION OF EXAMPLE EMBODIMENTS

Figure 1A:
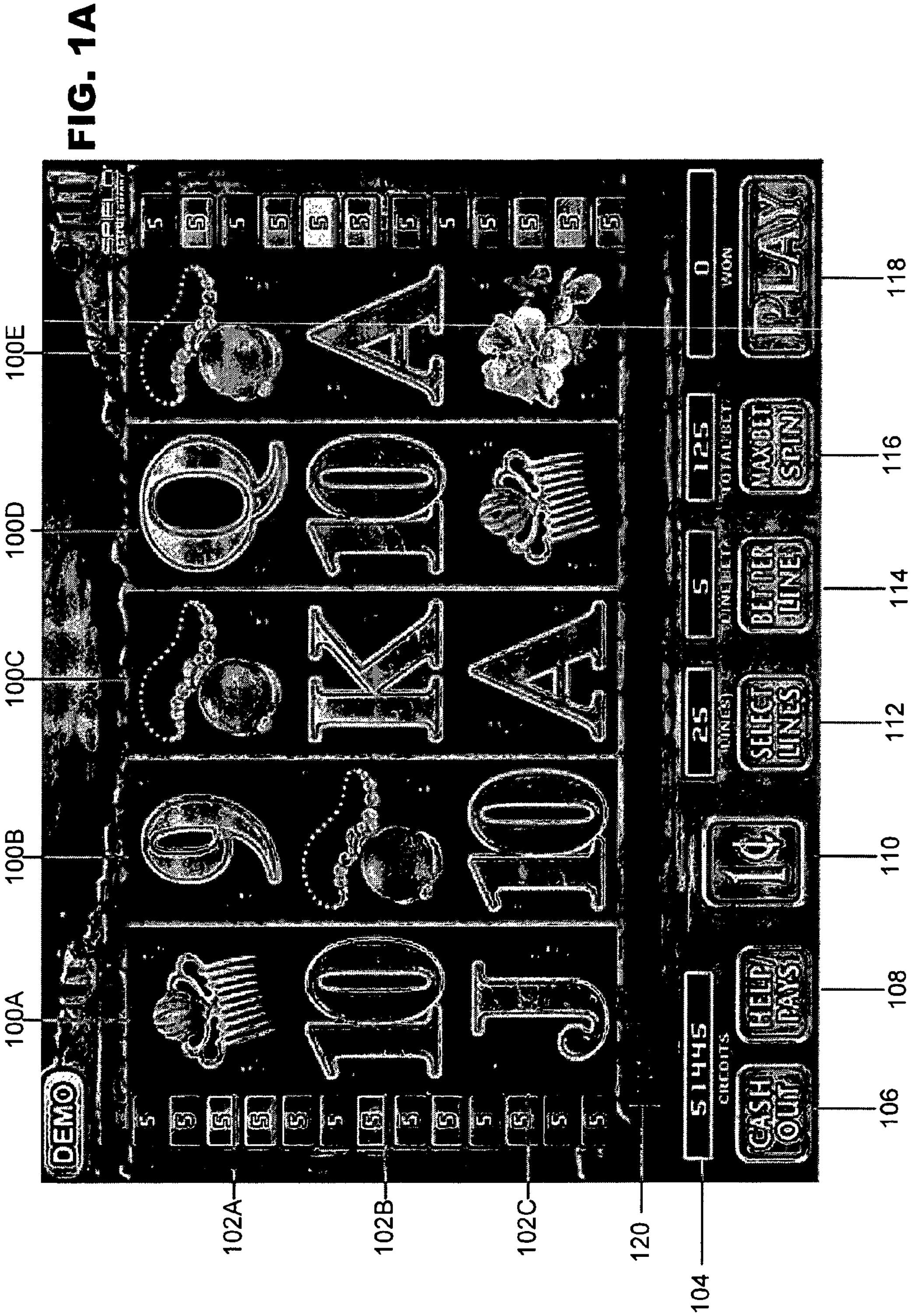
FIG. 1A illustrates an example screen shot of a wagering game, in accordance with an example embodiment of the present invention.

An example embodiment of the present invention displays, on a secondary display, a representation of a winning pay line to a player responsive to a winning outcome of a slot machine game. By displaying the representation of the winning pay line to the player, the player may more easily recognize the winning pay line when a winning outcome occurs, and why they have won. The slot machine game may be either a mechanical slot machine or a video slot machine. For example, a winning outcome may be triggered by a predefined quantity of symbols appearing along a predefined pay line in the slot machine game, e.g., on a primary display.

A video screen may be used as a device for displaying graphics and other information to the player. For example, a screen may be a CRT monitor, a LCD monitor, or any other monitor type. A display may be an area for displaying graphics or other information to the player. For example, a display may be a portion of a screen configured to display information to the player.

Another example embodiment of the present invention may be a system for facilitating play of a wagering game by a player. The system may include a primary display configured to display an arrangement of a set of symbols indicating an outcome and a winning pay line in the wagering game to the player. The system may include a secondary display, separate from the primary display, the secondary display configured to display a representation of the winning pay line. The system may include a processor in communication with the primary display and the secondary display. The processor may be configured to determine the arrangement of the set of symbols indicating the outcome, determine the winning pay line in the arrangement of the set of symbols, causing the primary display to display the arrangement of the set of symbols and the winning pay line, and causing the secondary display to display the representation of the winning pay line. The arrangement of the set of symbols may be determined responsive to determining the outcome. The outcome may be determined responsive to determining the arrangement of the set of symbols. The primary display may be further configured to highlight the winning pay line. The secondary display may display the representation of the winning pay line responsive to the primary display displaying the winning pay line. The wagering game may a mechanical slot machine game, the primary display may include a set of mechanical reels of a terminal, and the secondary display may be a video screen attached to the terminal. The wagering game may be a video slot game, the primary display may be displayed on a first portion of a video screen attached to a terminal, and the secondary display may be a second portion of the video screen, separate from the first portion. The primary display and the secondary display may be displayed in separate windows on the video screen. The system may include a payment receiver configured to receive a payment from the player, wherein the arrangement of the set of symbols and the representation of the winning pay line are displayed responsive to receiving the payment. The system may include a prize structure associating outcomes with prizes, wherein the prize structure is stored in a memory accessible to the processor. The system may include a dispenser configured to dispense a prize to the player responsive to a winning outcome. The processor may be located in a server in communication with a terminal, the terminal including the primary display and the secondary display. The processor may be in communication with the primary display and the secondary display over the Internet.

Another example embodiment of the present invention may be a method for facilitating play of a wagering game. The method may include, responsive to a player indication of a desire to play the wagering game, determining an arrangement of a set of symbols indicating an outcome and a winning pay line in the arrangement of the set of symbols. The method may include displaying the arrangement of the set of symbols and the winning pay line on a primary display. The method may include, responsive to displaying the arrangement of the set of symbols, simultaneously displaying a representation of the winning pay line on a secondary display, the secondary display separate from the primary display. The arrangement of the set of symbols may be determined responsive to determining the outcome. The outcome may be determined responsive to determining the arrangement of the set of symbols. The primary display may be further configured to highlight the winning pay line. The secondary display may display the representation of the winning pay line responsive to the primary display displaying the winning pay line. The outcome may be determined essentially randomly. The wagering game may be a mechanical slot machine game, the primary display may include a set of mechanical reels of a terminal depicting the symbols, and the secondary display may be a video display attached to the terminal. The wagering game may be a video slot game, the primary display may be a first portion of a video screen at a terminal, and the secondary display may be a second portion of the video screen, separate from the first portion. The arrangement of the set of symbols may simulate mechanical reels of a mechanical slot machine. The method may include receiving a payment from the player before determining the arrangement of the set of symbols. The method may include responsive to displaying the arrangement of the set of symbols associated, awarding a prize to the player. The prize may be determined from a prize structure. The prize may be dispensed to the player by a dispenser. The outcome may be determined by a server in communication with a terminal, the terminal including the primary display and the secondary display. The server may be in communication with the terminal over the Internet.

Another example embodiment of the present invention may be a computer readable medium including instructions configured to be executed on a processor, so that the processor performs a method for facilitating play of a wagering game. The method may include, responsive to a player indication of a desire to play the wagering game, determining an arrangement of a set of symbols indicating an outcome and a winning pay line in the arrangement of the set of symbols. The method may include displaying the arrangement of the set of symbols and the winning pay line on a primary display. The method may include, responsive to displaying the arrangement of the set of symbols, simultaneously displaying a representation of the winning pay line on a secondary display, the secondary display separate from the primary display.

Figure 4A:
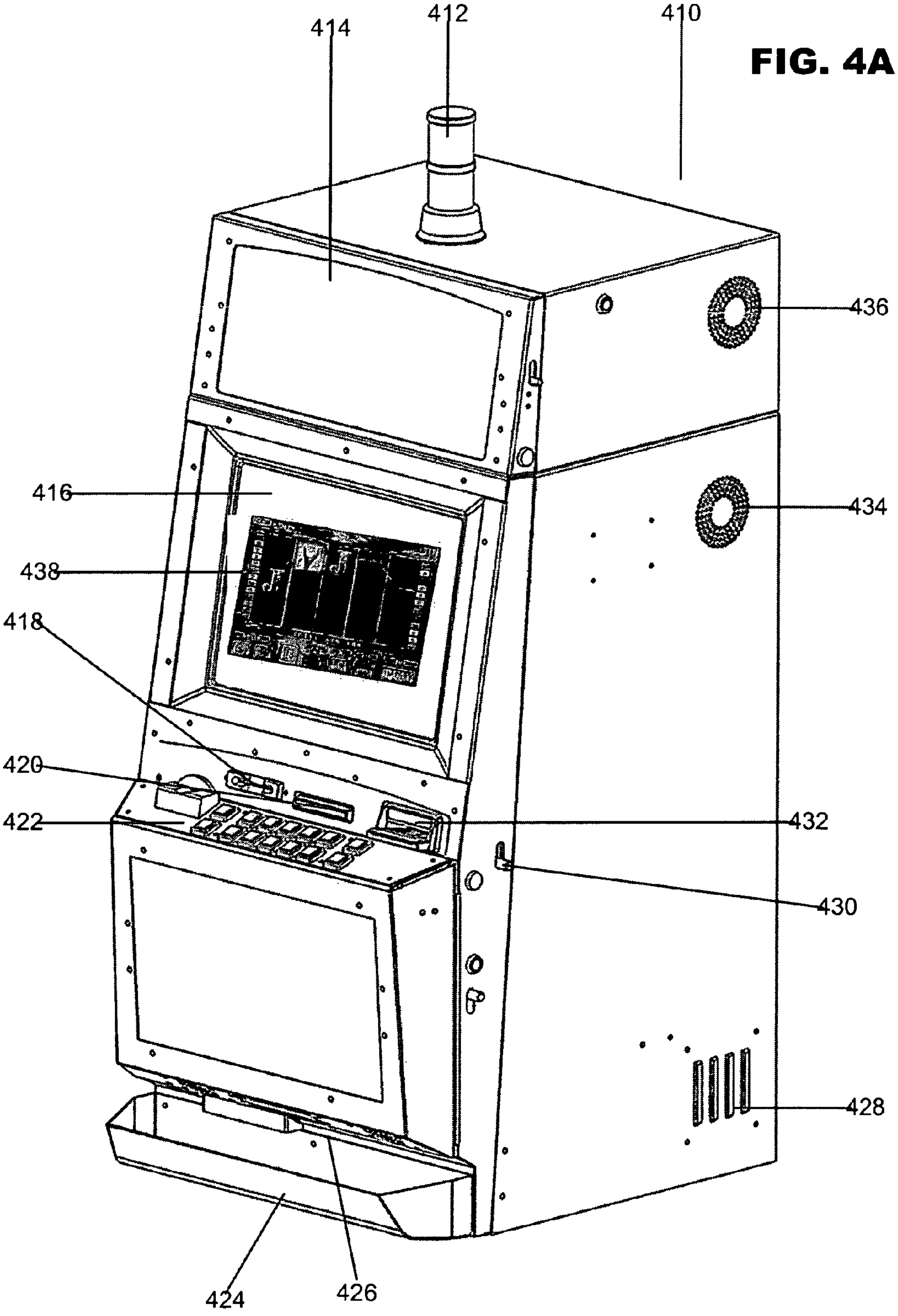
FIG. 4A illustrates an example video gaming machine, in accordance with an example embodiment of the present invention.

FIG. 1A illustrates an example screen shot of a wagering game, in accordance with an example embodiment of the present invention. The screen shot may be displayed on a monitor display of a video gaming machine (VGM) as depicted in FIG. 4A. The VGM may be configured to provide a video slot game as described in the following figures. The video slot game may be provided to a player, who indicates a wager and a wager amount. The VGM then determines an outcome, either winning or losing.

Figure 4B:
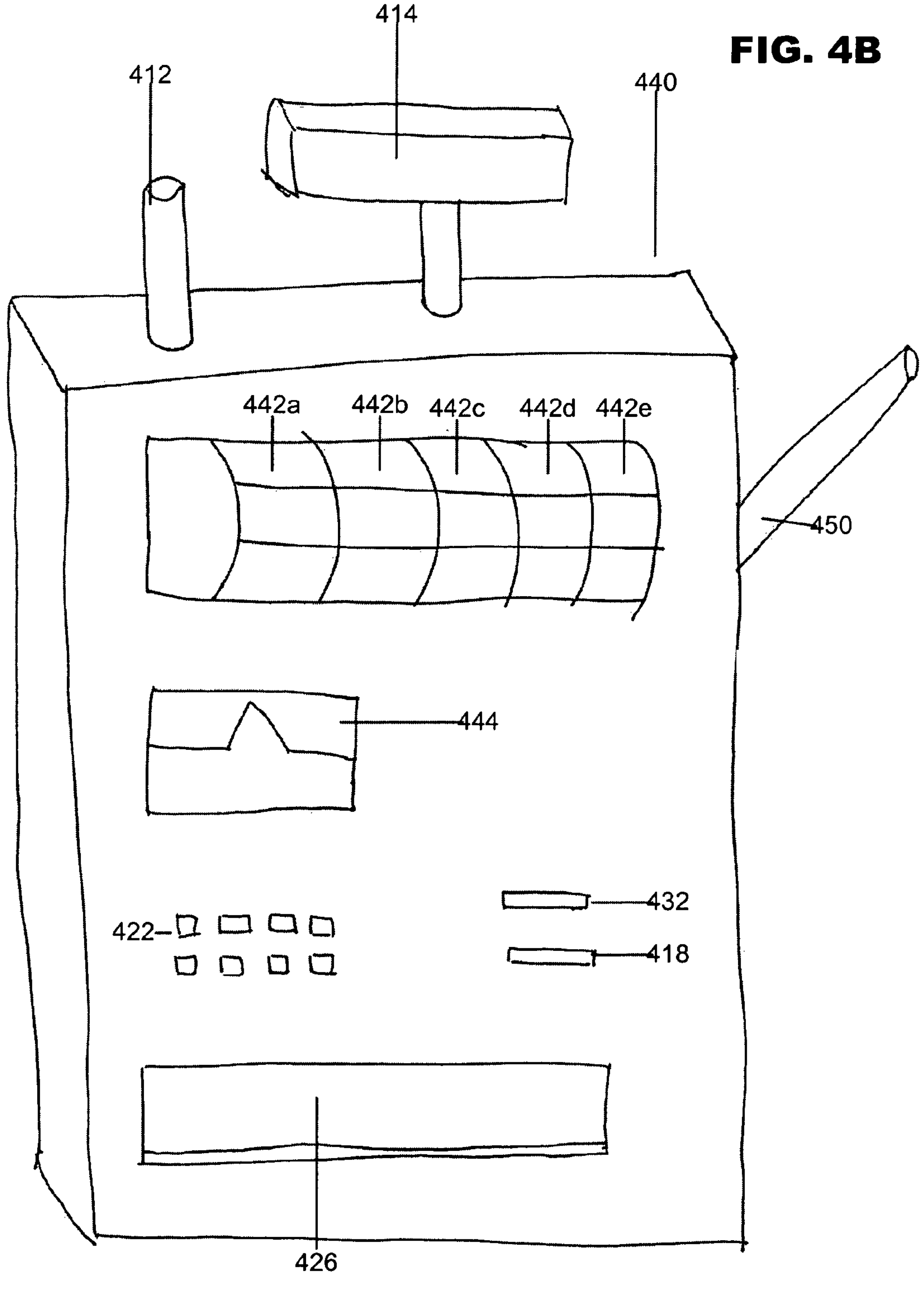
FIG. 4B illustrates an example mechanical slot machine, in accordance with an example embodiment of the present invention.

In an alternative embodiment, the wagering game may be provided on a mechanical slot machine, as depicted in FIG. 4B. On the mechanical slot machine, the embodiment will be similar, except the reels displayed will not be simulated. In an alternative embodiment, the wagering game may be provided on a personal computer, wherein the personal communication is in communication with a game server over a network, such as the Internet.

The display of a video slot game may include a plurality of elements, typically arranged in an array or grid. Each element may display a symbol. The elements may be arranged into columns and rows. For example, the video slot game may include columns 100A, 100B, 100C, 100D, and 100E. The video slot game may include rows 102A, 102B, and 102C. Each element may be associated with a column and a row within the displayed elements.

Figure 6A:
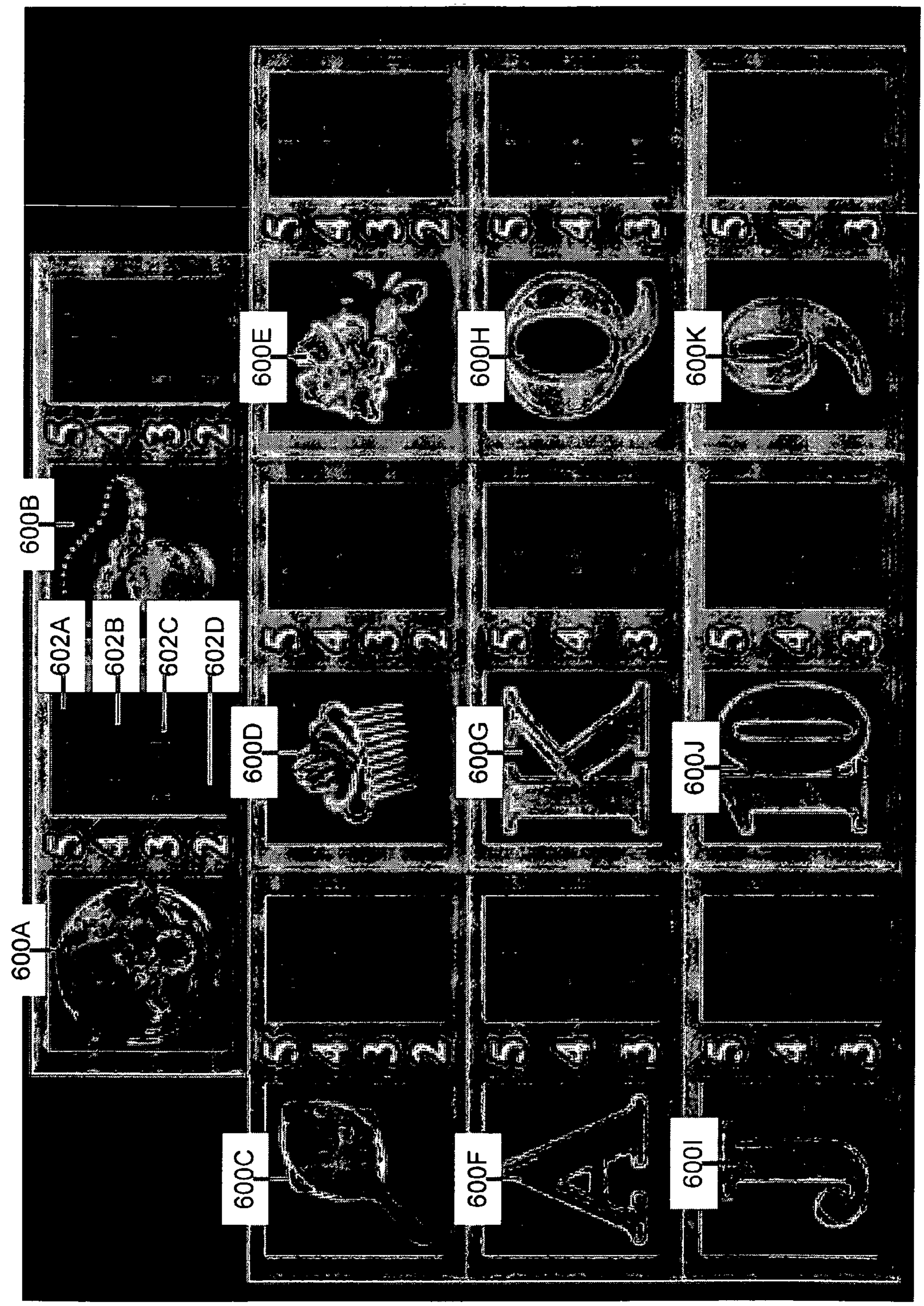
FIG. 6A illustrates an example pay structure, in accordance with an example embodiment of the present invention.
Figure 6B:
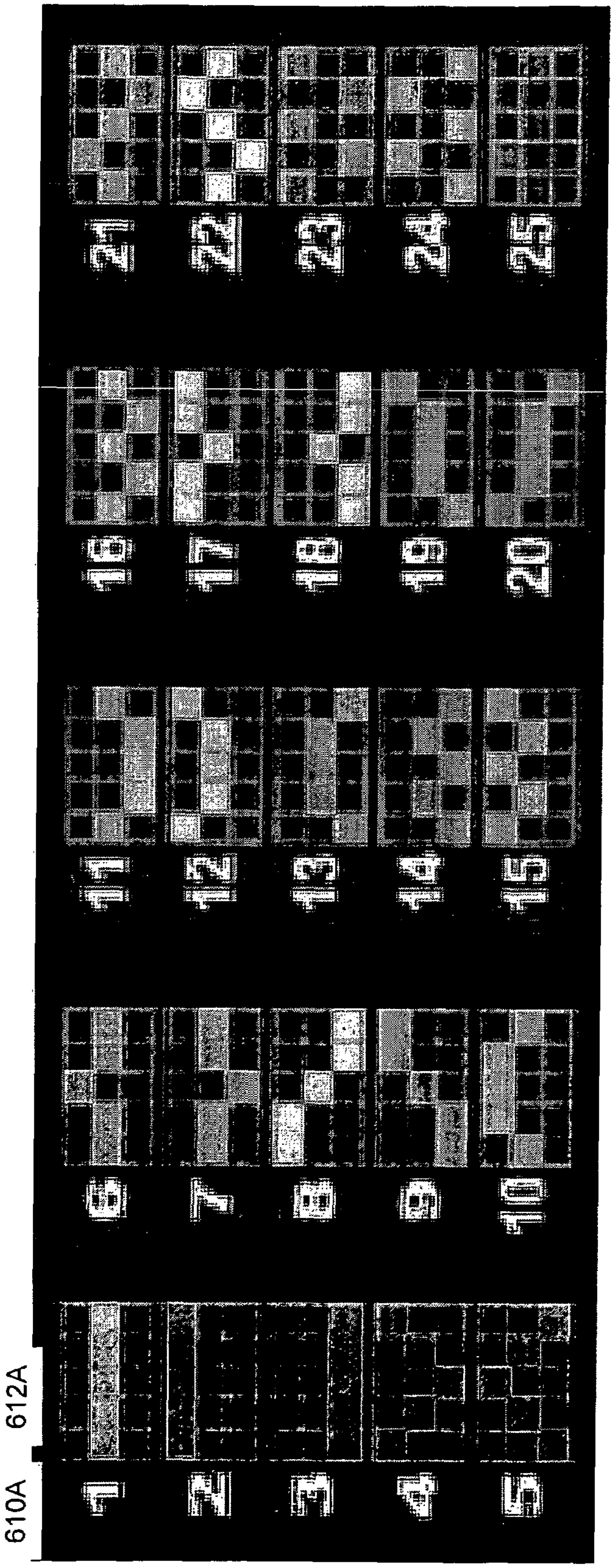
FIG. 6B illustrates an example pay line structure, in accordance with an example embodiment of the present invention.

The VGM may be configured to simulate a spin in the wagering game by animating the columns of elements to simulating spinning reels of a mechanical slot machine. After the spin, the elements may each display a symbol. The VGM may award a prize if the symbols end in a predefined winning pattern. For example, predefined winning patterns may be as depicted in FIG. 6A. Prizes may be anything of value, for example, cash, monetary awards, merchandise, or bonus games. Predefined winning patterns may also include pay lines as depicted in FIG. 6B. For example, a prize may be awarded when a predefined quantity of winning symbols appear on one or more of the pay lines.

A credits indicator 104 may indicate a quantity of credits available to the player. For example, credits may be currency in the wagering game, used to purchase wagers. Prizes may also be awarded in credits. Credits may also be counted within the VGM in a base denomination, for example a penny, a nickel, a quarter, a half-dollar, or a dollar. The denomination may be used to describe the VGM, for example, a penny-slot, a nickel-slot, a quarter-slot, a half-dollar-slot, or a dollar-slot.

A cash out button 106 may receive a player indication to cash out the player's credit. For example, the player may cash out his credits when he is finished with his gaming session and wishes to leave the VGM. For example, the credits may be dispensed from the VGM as currency (paper bills or coins) or as a printed voucher redeemable at a cashier for currency or other prizes. Alternatively, the prize may be dispensed after each play after a winning outcome.

A help/pays button 108 may display help screens to the player, including the pay structure and pay lines as depicted in FIGS. 6A and 6B.

A denomination indicator 110 may indicate to the player the denomination of the VGM. The denomination indicator 110 may be prominently displayed to be visible to players browsing past the VGM.

A select lines button 112 may allow the player to select a quantity of lines to be played on the VGM. Each line may be a collection of elements that are checked for a winning pattern of symbols. For example, the lines in the VGM may be as depicted in FIG. 6B. A prize may be awarded on a line if the collection of elements associated with the line display symbols in a predefined quantity, as depicted in FIG. 6A. With multiple lines, the player may have multiple ways to win on one spin of the virtual reels.

In an alternative embodiment, the VGM may award a prize, wherein the prize is dependant on the winning pattern of the symbols and a quantity of lines wagered.

A bet per line button 114 may allow the player to select a bet to be placed on each line. For example, the bet may vary between one credit and a predefined maximum quantity of credits acceptable at the VGM.

A max bet spin button 116 may be a shortcut button allowing the player to select the maximum bet available on all selected lines and immediately spin the reels on the VGM. This may save the player time from selecting a bet per line and indicating to the VGM to spin the virtual reels. This may also increase gaming revenues from the VGM by making it convenient for the player to make a maximum bet in the wagering game.

The game may be played when the player indicates a quantity of lines to play, a bet amount for each line, and presses the play button 118. The game may proceed by the VGM animating the elements in columns 100A, 100B, 100C, 100D, and 100E to simulate reels in a traditional slot machine. For example, the columns may be animated so it appears the elements are randomly spinning on reels. The animation may finish with the elements in a resulting pattern, where the resulting pattern may be determined randomly, randomly within predefined bounds, or in another predetermined manner. The resulting pattern may be a winning pattern or a losing pattern. The VGM may award a prize when a winning pattern occurs and display a consolidation or do nothing when a losing pattern occurs.

A play button 118 may allow the player to spin the virtual reels on the VGM. It will be appreciated that an alternative input device may be used, such as a real button, for the player to indicate their desire to play the game.

A secondary display 120 may be included in the screen shot. The secondary display 120 may be configured to display a representation of one or more pay lines. For example, the pay lines may be as depicted in FIG. 6B. The secondary display may display pay lines when a winning condition has been triggered, and display the pay lines which were used in determining that the winning condition has occurred. This may quickly and easily indicate to the player which pay lines and elements triggered the winning condition.

In an alternative embodiment, for example, when the wagering game is provided on a mechanical slot machine, the secondary display 120 may be a separate display attached to the mechanical slot machine.

In an alternative embodiment, the secondary display 120 may be configured to display player-selected pay lines. For example, the player may select multiple pay lines for a wager on as well as a wager amount. If any of the player-selected pay lines display a set of predefined symbols, a winning outcome may be triggered. In this embodiment, the secondary display 120 may display player-selected pay lines for ease of identification by the player of which pay lines have been selected.

Figure 1B:
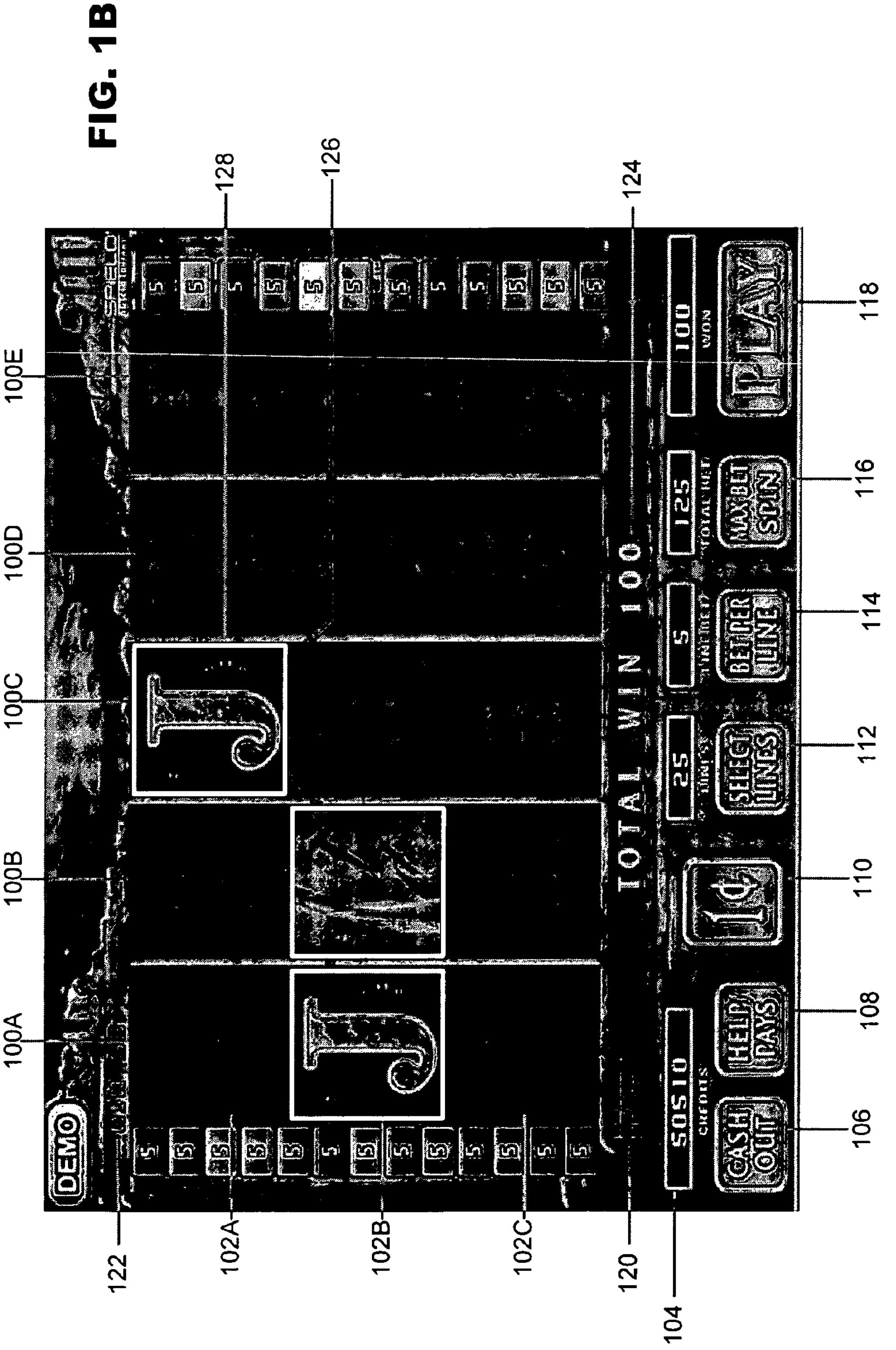
FIG. 1B illustrates an example screen shot of a first winning pattern in the wagering game, in accordance with an example embodiment of the present invention.

FIG. 1B illustrates an example screen shot of a first winning pattern in the wagering game, in accordance with an example embodiment of the present invention. The screen shot may be displayed after a spin has occurred on the virtual reels, and a predefined winning pattern has occurred in the elements. The occurrence of the winning pattern may trigger a winning outcome. The features of the screen shot may be similar to the features of the screen shot depicted in FIG. 1A.

The secondary display 120 may indicate a pay line which resulted in the predefined winning pattern. The secondary display 120 may be configured to display representations of pay lines. For example, pay lines may be as depicted in FIG. 6B. The pay lines may be represented with different colors in the secondary display 120.

A total win indicator 124 may indicate to the player a total prize to be awarded for the winning pattern. For example, the total prize to be awarded may be a combination of all winning patterns displayed in the elements. The prize associated with each winning pattern may be looked up from a prize structure.

The pay line of the winning pattern may be indicated by a highlighted pay line 126. The pay line may also be reflected in the secondary display 120. The symbols of the winning pattern may be indicated by highlighted symbols 128. Remaining symbols not part of the winning pattern may be grayed out for ease of identification of the winning pattern by the player.

From the depicted screen shot, it can be see that two Js have appeared along the pay line, as well as a wild symbol. Thus, three Js have appeared, which may be a winning pattern as defined in FIG. 6A.

It will be understood that multiple winning patterns may occur as a result of a spin. If multiple winning patterns have occurred, each winning pattern may be displayed one after another to the player, both in the set of elements and on the secondary display 120. Displaying each winning pattern may include displaying the set of symbols and the pay line associated with the winning pattern, as well as indicating the pay line on the secondary display 120.

Figure 1C:
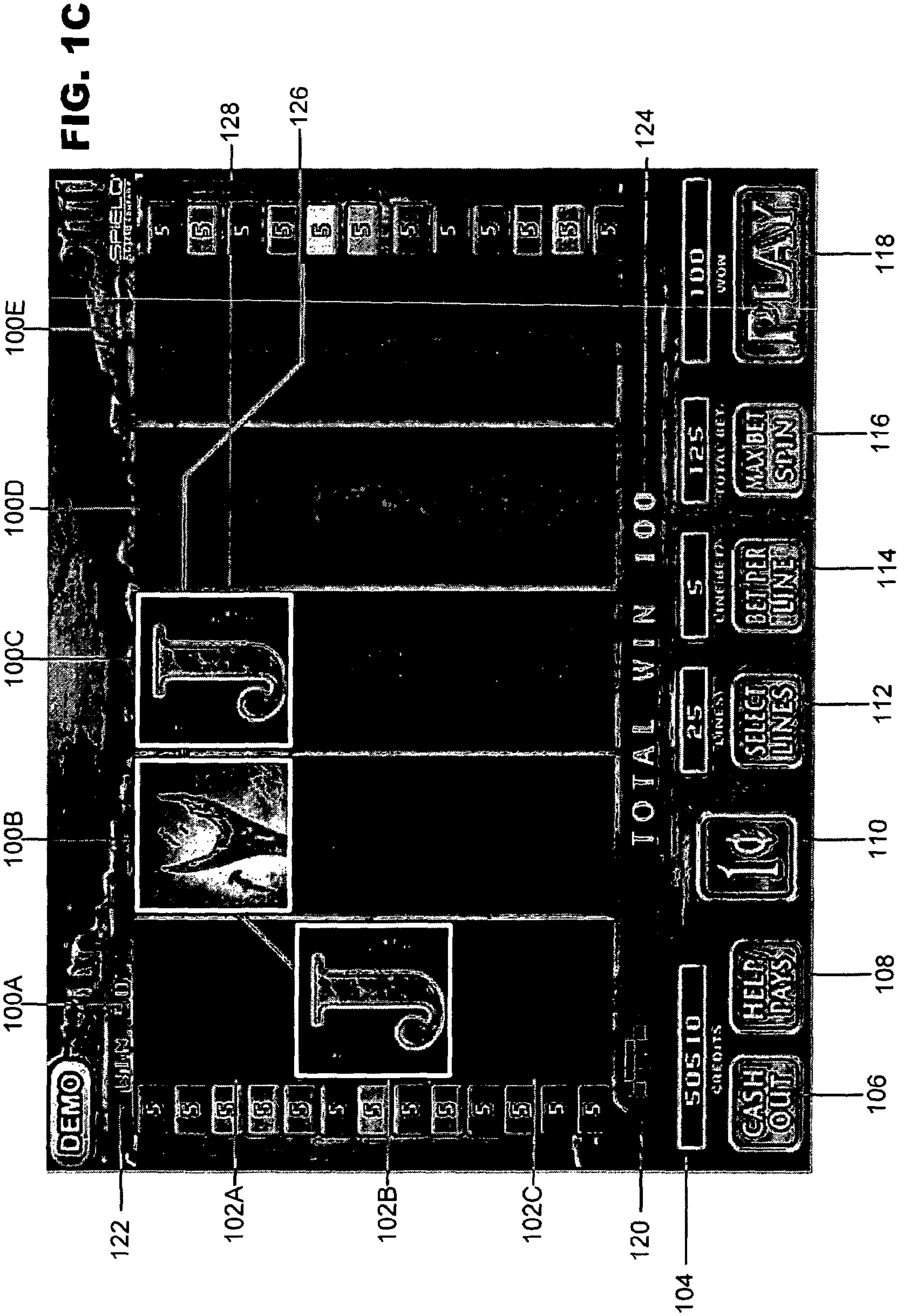
FIG. 1C illustrates an example screen shot of a second winning pattern in the wagering game, in accordance with an example embodiment of the present invention.

FIG. 1C illustrates an example screen shot of a second winning pattern in the wagering game, in accordance with an example embodiment of the present invention. The screen shot may be displayed after a spin has occurred on the virtual reels, and a predefined winning pattern has occurred in the elements. The occurrence of the winning pattern may trigger a winning outcome. The features of the screen shot may be similar to the features of the screen shot depicted in FIG. 1B. The primary difference between FIG. 1C and FIG. 1B is a different winning pattern, which is displayed in the secondary display 120, the pay line 126 and the highlighted symbols 128.

Figure 2:
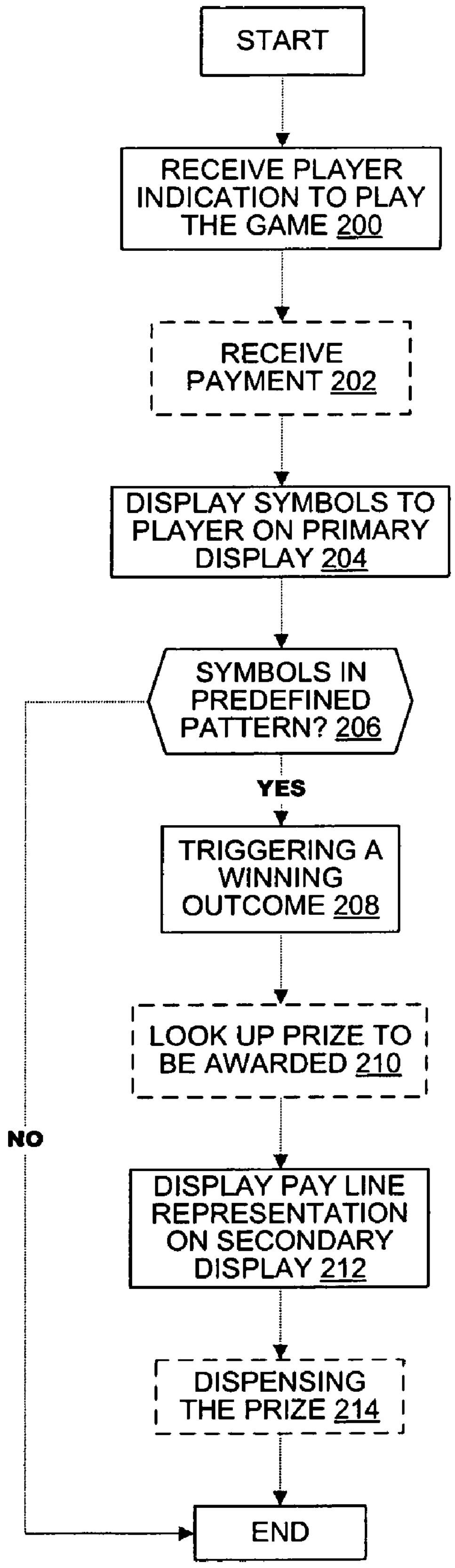
FIG. 2 illustrates a first example procedure for providing a wagering game, in accordance with an example embodiment of the present invention.

FIG. 2 illustrates a first example procedure for providing a wagering game, in accordance with an example embodiment of the present invention. The procedure may be executed on a terminal such as a VGM or a mechanical slot machine as depicted in FIGS. 4A and 4B. The procedure may provide a wagering game to a player, such as a video slot game or a mechanical slot machine game.

It will be appreciated that the procedure may provide other wagering games that involve patterns of symbols. For example, the wagering game may be video keno or video bingo, and a secondary display displays a representation of a winning pattern of symbols.

In 200, procedure may receive a player indication of a desire to play the wagering game. For example, the player indication may be a button press at the terminal, or anther input by the player.

In 202, the procedure may optionally receive a payment from the player. For example, currency may be received at the terminal through a payment acceptor, as later described. A wager amount may be the entire amount received from the player, or the terminal may receive an indication from the player through an input of what the wager amount is. The wager amount may be in increments of the denomination of the terminal, as subsequently described.

In one example embodiment, the player indication received in 200 may be the terminal receiving a payment from the player.

In 204, the procedure may display a set of symbols to the player. The set of symbols may be displayed on a monitor of a VGM, or on a set of reels of a mechanical slot machine. Reels of a mechanical slot machine are subsequently described. For example, the set of symbols on a VGM may be as depicted in FIGS. 1A, 1B and 1C.

In 206, the procedure may test whether the symbols are in a predefined winning pattern. For example, a predefined winning pattern may include a quantity of symbols appearing along a pay line. If the symbols are in a predefined winning pattern, the procedure may proceed to 208. If the symbols are not in a predefined winning pattern, the procedure may end.

In an alternative embodiment, the VGM may first determine whether an outcome will be a winning outcome or a losing outcome before displaying the symbols to the player in 204. The VGM may also determine a prize to be awarded if the outcome is a winning outcome.

In 208, the procedure may trigger a winning outcome. If the symbols are in a predefined winning pattern, then the player has won a prize. The winning outcome may be accompanied by visual and audio effects at the terminal, such as blinking lights or audible music.

In 210, the procedure may optionally look up the prize to be awarded in a prize structure. For example, the prize structure may associate a predefined winning pattern with a prize to be awarded to the player. The prize structure may be a set of symbols as depicted in FIG. 6A. A prize may be awarded when a quantity of symbols appear along a pay line, as depicted in FIG. 6B. The prize may be the wager amount received multiplied by a multiplier indicated in FIG. 6A, the multiplier associated with the symbol and quantity of symbols.

In 212, the procedure may display a pay line representation on a secondary display. The secondary display may be a separate display attached to the terminal or a portion of a primary display. The pay lines may be as depicted in FIG. 6B. In an alternative embodiment, the primary display may be a first screen, and the secondary display may be a second screen. In one embodiment, the secondary display may only display a pay line representation responsive to a winning outcome.

In 214, the procedure may optionally dispense the prize to be awarded to the player. For example, the prize may be dispensed from a dispenser. For example, the prize may be anything of value as subsequently discussed.

Figure 3:
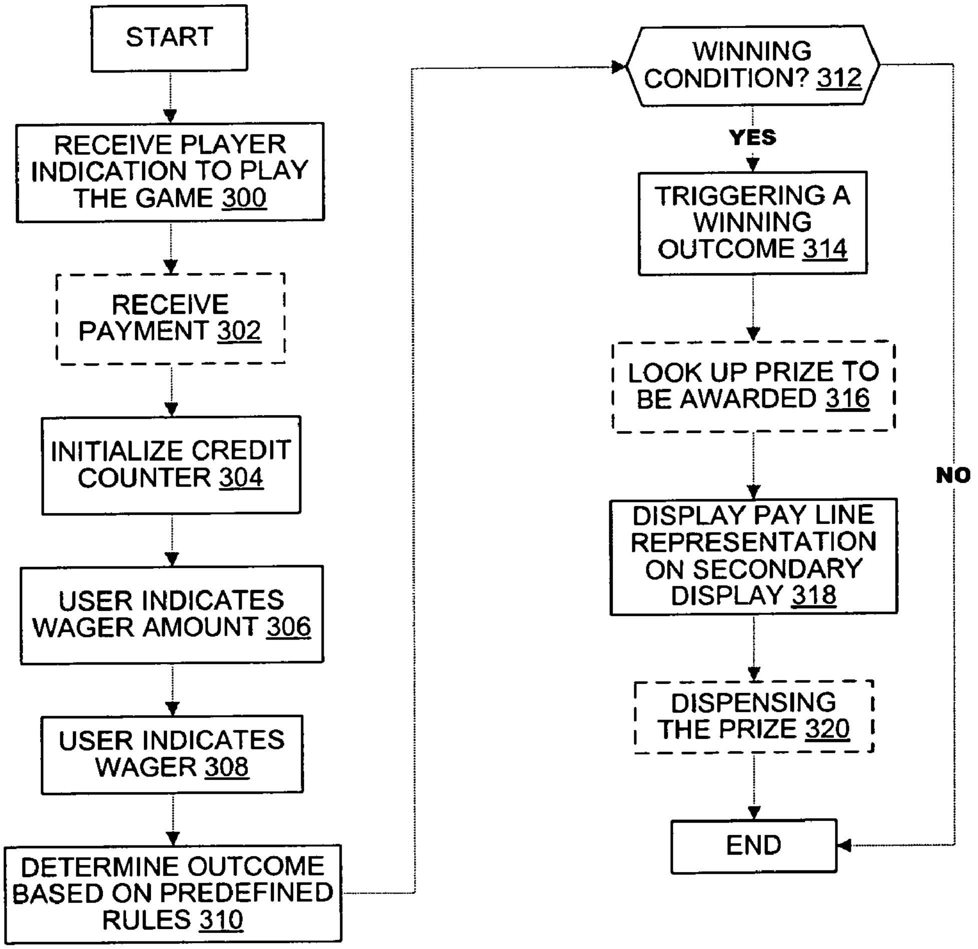
FIG. 3 illustrates a second example procedure for providing a wagering game, in accordance with an example embodiment of the present invention.

FIG. 3 illustrates a second example procedure for providing a wagering game, in accordance with an example embodiment of the present invention. Similarly to the procedure depicted in FIG. 2, the procedure may be executed on a terminal such as a VGM or a mechanical slot machine as depicted in FIGS. 4A and 4B. The procedure may provide a wagering game to a player, such as a video slot game or a mechanical slot machine game.

In 300, procedure may receive a player indication of a desire to play the wagering game. For example, the player indication may be a button press at the terminal, or anther input by the player.

In 302, the procedure may optionally receive a payment from the player. For example, currency may be received at the terminal through a currency acceptor, as later described.

In 304, the procedure may initialize a credits counter. For example, the credits counter may represent how many credits the player has deposited in the game, in increments of the denomination of the terminal, as subsequently described. The credits counter may be initialized to reflect the payment received from the player in 302.

In 306, the procedure may receive an indication from the player of a wager amount. The wager amount may be the entire amount received from the player, or the terminal may receive an indication from the player through an input of what the wager amount is. The wager amount may be in increments of the denomination of the terminal, as subsequently described. The wager amount may, in part, determine a prize to be awarded to the player in a winning outcome, as described elsewhere.

In 308, the procedure may receive an indication from the player of a wager. For example, an indication of a wager may represent the player's acceptance of the wager amount and desire to proceed with the game. The indication of a wager may be the player providing an input, for example, by pressing a button, on a VGM to begin an animated sequence of simulated spinning of reels displaying the symbols. Alternatively, the indication of a wager may be the player pulling an arm on a mechanical slot machine to begin spinning of the reels displaying the symbols.

In 310, the procedure may determine an outcome of the wagering game based on predetermined rules. For example, the outcome may be determined by looking up an outcome structure that indicates the outcome and associated prize to be awarded. The procedure may then determine a set of symbols to be displayed to the player to provide the determined outcome and prize. Alternatively, the outcome may be determined substantially randomly by the terminal. In an alternative embodiment, the outcome may be determined by a server in communication with the terminal.

The procedure may then display the set of symbols to the player. The set of symbols may indicate a winning or losing outcome.

In 312, the procedure may test whether a winning condition was met or not. For example, the winning condition may be a winning outcome as determined in 306. It will be understood that the winning condition may be any other condition, including a randomly determined condition such as an elapsed time or a quantity of plays on the terminal.

In 314, the procedure may trigger a winning outcome. If the symbols are in a predefined winning pattern, then the player has won a prize. The winning outcome may be accompanied by visual and audio effects at the terminal, such as blinking lights or audible music.

In 316, the procedure may optionally look up the prize to be awarded in a prize structure. For example, the prize structure may associate a predefined winning pattern with a prize to be awarded to the player. The prize structure may also associate winning conditions which do not include a predefined winning pattern with a prize.

In 318, the procedure may display a pay line representation on a secondary display. The pay line representation may be displayed substantially simultaneously with the set of symbols indicating the outcome. The secondary display may be a separate display attached to the terminal or a portion of a primary display. The pay lines may be as depicted in FIG. 6B. The pay line displayed may be the pay line that triggered the winning condition in 306.

In 320, the procedure may optionally dispense the prize to be awarded to the player. For example, the prize may be dispensed from a dispenser. For example, the prize may be anything of value as subsequently discussed.

FIG. 4A illustrates an example video gaming machine, in accordance with an example embodiment of the present invention. For example, the machine may be a modified Aura™, WinWave™, PowerStation 5™, or PowerStation Plus™ gaming machine, available through the Spielo® division of GTech® Corporation. A video gaming machine 410 may be configured to conduct a wagering game. For example, a wagering game may be a slot machine game, a lottery, a video game, or another game of chance involving a wager. Alternatively, the video gaming machine 410 may be a video poker game terminal, a video wagering game terminal, a video slot machine terminal, a video slot machine, or a video game terminal. The video gaming machine 410 may be in communication with a server. Alternatively, the video gaming machine 410 may be a modified slot machine terminal.

The video gaming machine 410 may include a blinker 412. The blinker 412 may enclose a light source configured to blink on and off. For example, the blinker 412 may be configured to blink when a large prize is awarded from the video gaming machine 410.

The video gaming machine 410 may include a lighted display 414. For example, the lighted display 414 may include a logo, a game name or other visually attractive graphics. The lighted display 414 may alternatively be a liquid crystal display screen. For example, the lighted display 414 may be configured to display graphics and text.

The video gaming machine 410 may include a display screen 416. For example, the display screen 416 may be a liquid crystal display screen (LCD) or a cathode ray tube (CRT) screen. For example, the display screen 416 may enclose a viewable display area visible to a player. Alternatively, the display screen 416 may be a touch screen, configured to accept player inputs of touching the screen.

The display screen 416 may display a screen shot 438 as depicted in FIG. 1B. The screen shot 438 may include a secondary display in a portion of the screen as described above.

The video gaming machine 410 may include a player's card accepter 418, a printer 420 and a currency accepter 432. For example, the player's card accepter 418 may accept a frequent player's card. The frequent player's card may include a player's identifying information and play history. Alternatively, the frequent player's card may include an identifier that is associated with a player's identifying information and wager history. For example, the printer 420 may be configured to print a voucher or ticket for the player. The currency accepter 432 may be configured to accept cash bills in various denominations for a player's wager. The currency accepter 432 may also be configured to accept printed vouchers and tickets, or magnetic cards such as proprietary debit cards.

The video gaming machine 410 may include input modules 422. For example, the input modules 422 may be a set of buttons. The input modules 422 may be configured to receive input from a player during a wagering game. Other forms of input modules may be used, for example, a mouse-pointer device or a voice recognition module.

The video gaming machine 410 may include a dispenser tray 424 and a dispenser 426. The dispenser 426 may be configured to dispense a prize. For example, a prize may be currency or a prize receipt redeemable at a cashier. The dispenser tray 424 may be configured to catch and hold the prize after it is dispensed. The dispenser tray 424 may be configured for easy access by the player to the dispensed prize.

The video gaming machine 410 may include openings 428, 434 and 436. Opening 428 may be configured to allow sound through. For example, interior speakers may be located behind opening 428. The openings 436 and 436 may be configured to allow ambient air to circulate into and out of an interior of the video gaming machine 410. Ambient air circulation may assist in maintaining an optimal operating temperature for the video gaming machine 410. In an alternative embodiment, fans (not depicted) may be installed on the interior of the video gaming machine 410 to assist air circulation.

The video game machine 410 may include a latch 430. For example, the latch 430 may be configured to release a front door of the video game machine 410 for opening. When the front door is opened, it may be possible for a technician to access an interior of the video game machine 410 for upgrades or maintenance.

For example, the terminal may be a personal computer (PC) (either a standalone computer or a thin client connected to a network), a cellular phone, a personal digital assistant (PDA), a smart phone, a wireless device, a handheld device, or any other device configured to provide the wagering game to the player. The terminal may be configured to deactivate or implement a different rule set when it is moved to a jurisdiction where the wagering game is illegal or otherwise regulated.

FIG. 4B illustrates an example mechanical slot machine, in accordance with an example embodiment of the present invention. A mechanical slot machine 440 may be configured to conduct a wagering game for a player. For example, a wagering game may be a slot machine game. The mechanical slot machine 440 may be in communication with a server. The mechanical slot machine 440 may be similar to the VGM depicted in FIG. 4A, with similar features.

The mechanical slot machine 440 may include a plurality of reels 442*a*, 442*b*, 442*c*, 442*d*, and 442*e*. Each reel may include a plurality of symbols on the outside rim and configured to spin around an axis so that the outside rim is visible to the player. The plurality of reels may be movably attached to the interior of the mechanical slot machine 440 and protected behind a transparent covering. The transparent covering may be a rigid piece of plastic or glass with high strength to protect the reels from player tampering.

The mechanical slot machine 440 may include a secondary display 444. The secondary display 44 may be configured to represent an indication of a pay line. For example, pay lines may be as depicted in FIG. 6B. The secondary display 444 may be an LCD or other display configured to display pay line representations to the player.

The mechanical slot machine 440 may include a pull arm 450. The pull arm 450 may be rotatable by the player around a point fixed on the mechanical slot machine 440. The player may pull on the pull arm 450 to indicate a wager in the slot machine game.

Figure 5:
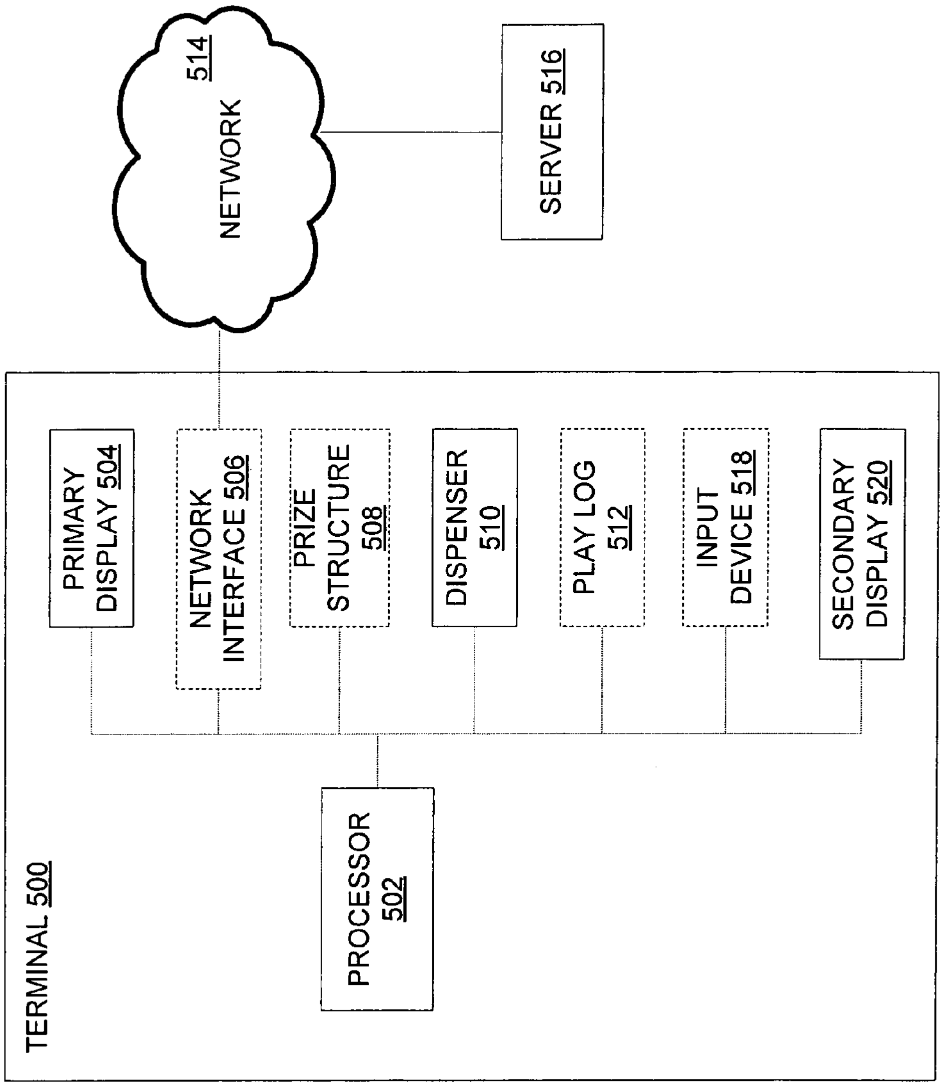
FIG. 5 illustrates an example system for providing a wagering game, in accordance with an example embodiment of the present invention.

FIG. 5 illustrates an example system for providing a wagering game, in accordance with an example embodiment of the present invention. For example, the system may include a terminal 500 which may be a VGM as depicted in FIG. 4A or a mechanical slot machine as depicted in FIG. 4B. The VGM may be configured to provide a virtual slot machine game as described in FIGS. 1A, 1B, and 1C to a player.

The terminal 500 may include a processor 502. The processor 502 may be configured to execute the procedures depicted in FIGS. 2 and 3. The processor 502 may be configured to provide screen shots as depicted in FIGS. 1A, 1B, and 1C to a primary display 504.

The terminal 500 may include a primary display 504. The primary display 504 may be configured to display the screen shots as depicted in FIGS. 1A, 1B, and 1C. The primary display 504 may be, for example, an LCD or a CRT display. If the terminal 500 is a mechanical slot machine display, the display 504 may be at least one rotating reel with an outside rim depicting symbols. The reel may be movably attached to the terminal so that the symbols are displayed to the player. The reel may also be configured to spin.

The terminal 500 may optionally include a network interface 506. The network interface 506 may be configured to communicate between the terminal 500 and a network. For example, the network interface 506 may be an Ethernet adaptor, a modem, or some other communication adaptor for converting information from the processor 502 into a form that can be carried over a communications network.

The terminal 500 may optionally include a prize structure 508. The prize structure 508 may include the prizes awarded in the game as well as winning patterns associated with each prize. For example, the prize structure 508 may include symbols that must be displayed in the elements on the VGM's display or on the reels of a mechanical slot machine, as well as how they are arranged along predefined lines. For example, the prize structure 508 may include information depicted in FIGS. 6A and 6B.

The terminal 500 may include a dispenser 510. The dispenser 510 may award the player's prize when the player elects to cash out of the game. The dispenser 510 may be configured to dispense currency, such as coins, to award the prize. Alternatively, the dispenser 510 may be a printer configured to print a voucher redeemable at a cashier for the prize. Alternatively, the dispenser 510 may be configured to dispense merchandise or other physical goods as the prize. Alternatively, the dispenser 510 may be configured to dispense any suitable prize.

The terminal 500 may optionally include a play log 512. The play log 512 may be a log maintained by the terminal 500 of transactions. For example, transactions may include wagers provided to the terminal 500, prizes dispensed by the terminal 500, winning and non-winning spin results, a bet amount, selected predefined lines, a date and time of a wheel spin, a frequent player identification, or any other information pertaining to the operation of the terminal 500.

For example, the information may be used for maintenance or audit purposes by the operator of the terminal 500. The terminal 500 may require maintenance after a predefined number of spins or a predefined number or amount of prizes awarded. The operator of the terminal 500 may review the information to audit the performance of the game, for example, by checking for unusual patterns of prizes being awarded.

The terminal 500 may include an input device 518, such as a keypad, buttons, pointing device, scrolling wheels, or other conventional input devices. The input device 518 may be configured to receive inputs from the player required during the game. It is understood that the terminal 500 may include more than one input device, though only one is depicted.

In an alternative embodiment, the display 504 may be a touch-sensitive screen which receives player inputs via the player touching the screen on displayed virtual buttons. In this example embodiment, an input device 518 may not be required.

The terminal 500 may include a secondary display 520. The secondary display 520 may be configured to indicate a winning pay line after a winning outcome in the wagering game. For example, the secondary display 520 may be separate from the primary display 504 or it may be a portion of the primary display 504.

The terminal 500 may be in communication with a server 516 over a network 514. The network 514 may be any communications link that may carry communications between the terminal 500 and the server 516. For example, the network 514 may be an Ethernet network, a local area network, a wide area network, a virtual private network over another network, the Internet, or any other network which can carry communications.

The server 516 may be a central server located at a location remote from the terminal 500. The server 516 may coordinate a plurality of terminals (not depicted) in the system distributed at multiple locations. The server 516 may function to centralize control of the terminals.

It will be understood that functionality included in the terminal 500 may be moved to the server 516 while remaining within the scope of this specification.

It will be understood that the system may be a standalone terminal, without the network 514 or the server 516. A standalone terminal may be used when establishing a communication connection over a network to a server is cost-prohibitive or otherwise undesirable.

FIG. 6A illustrates an example pay structure, in accordance with an example embodiment of the present invention. For example, the pay structure may be used in part to determine the prize awarded to a player in a wagering game. The prize may be further determined based on the player's wager amount. The prize may be awarded when a quantity of symbols appear on a predefined pay line. For example, predefined pay lines may be as depicted in FIG. 6B.

The pay structure may include symbols 600A, 600C, 600D, 600E, 600F, 600G, 600H, 600I, 600J, and 600K. For example, the symbols may be displayed in elements on a display in a VGM as depicted in FIG. 4A or on at least one reel in a mechanical slot machine as depicted in FIG. 4B.

Each symbol may be associated with a prize amount. The prize amount may be a multiplier used to multiply by the player's wager amount to determine the prize to be awarded. For example, the symbol 600A may be associated prize amounts 602A, 602B, 602C, and 602D.

The prize amount 602A may be used when the spin results in 5 of the symbol 600A along a predefined pay line. The prize amount 602B may be used when the spin results in 4 of the symbol 600A along a predefined pay line. The prize amount 602C may be used when the spin results in 3 of the symbol 600A along a predefined line. The prize amount 602D may be used when the spin results in 2 of the symbol 600A along a predefined pay line. The pay structure may be stored in a variety of data structures, for example, on write-once memory or other machine-readable medium.

For example, if five Jacks ("J") appeared along a pay line, a prize of 125 multiplied by a player wager may be awarded. If four Jacks appeared, a prize of 25 multiplied by the player wager may be awarded. If three Jacks appeared, a prize of 10 multiplied by the player wager may be awarded.

FIG. 6B illustrates an example pay line structure, in accordance with an example embodiment of the present invention. The pay lines may be predefined and used in conjunction with the pay structure depicted in FIG. 6A to determine a prize to be awarded to the a player in a wagering game. The predefined pay lines may be stored in a variety of data structures, for example, on write-once memory or other machine-readable medium.

MODIFICATIONS

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A system for facilitating play of a wagering game by a player, comprising:

a primary display configured to display an arrangement of a set of symbols indicating an outcome and a winning pay line in the wagering game to the player;

a secondary display, separate from the primary display, the secondary display configured to display a representation of the winning pay line shown in the primary display; and a processor in communication with the primary display and the secondary display, the processor configured to determine the arrangement of the set of symbols indicating the outcome, determine the winning pay line in the arrangement of the set of symbols, cause the primary display to display the arrangement of the set of symbols and the winning pay line, and responsive to the primary display displaying the winning pay line, cause the secondary display to display the representation of the winning pay line.

2. The system of claim 1, wherein the arrangement of the set of symbols is determined responsive to determining the outcome.

3. The system of claim 1, wherein the outcome is determined responsive to determining the arrangement of the set of symbols.

4. The system of claim 1, wherein the primary display is further configured to highlight the winning pay line.

5. The system of claim 1, wherein the wagering game is a mechanical slot machine game, the primary display includes a set of mechanical reels of a terminal, and the secondary display is a video screen attached to the terminal.

6. The system of claim 1, wherein the wagering game is a video slot game, the primary display is displayed on a first portion of a video screen attached to a terminal, and the secondary display is a second portion of the video screen, separate from the first portion.

7. The system of claim 6, wherein the primary display and the secondary display are displayed in separate windows on the video screen.

8. The system of claim 1, further comprising:

a payment receiver configured to receive a payment from the player, wherein the arrangement of the set of symbols and the representation of the winning pay line are displayed responsive to receiving the payment.

9. The system of claim 1, further comprising:

a prize structure associating outcomes with prizes, wherein the prize structure is stored in a memory accessible to the processor.

10. The system of claim 1, further comprising:

a dispenser configured to dispense a prize to the player responsive to a winning outcome.

11. The system of claim 1, wherein the processor is located in a server in communication with a terminal, the terminal including the primary display and the secondary display.

12. The system of claim 11, wherein the processor is in communication with the primary display and the secondary display over the Internet.

13. The system of claim 1, wherein the display of the representation of the winning pay line includes a display of the pattern of the winning pay line.

14. The system of claim 1, further comprising a plurality of winning pay lines in the primary display, wherein the secondary display is configured to show a representation of each winning pay line in sequence.

15. A method for facilitating play of a wagering game, comprising:

responsive to a player indication of a desire to play the wagering game, determining an arrangement of a set of symbols indicating an outcome and a winning pay line in the arrangement of the set of symbols;

displaying the arrangement of the set of symbols and the winning pay line on a primary display; and responsive to displaying the arrangement of the set of symbols, displaying, on a secondary display and with a processor, a representation of the winning pay line shown in the primary display, the secondary display separate from the primary display.

16. The method of claim 15, wherein the arrangement of the set of symbols is determined responsive to determining the outcome.

17. The method of claim 15, wherein the outcome is determined responsive to determining the arrangement of the set of symbols.

18. The method of claim 15, wherein the primary display is further configured to highlight the winning pay line.

19. The method of claim 15, wherein the secondary display displays the representation of the winning pay line responsive to the primary display displaying the winning pay line.

20. The method of claim 15, wherein the outcome is determined essentially randomly.

21. The method of claim 15, wherein the wagering game is a mechanical slot machine game, the primary display includes a set of mechanical reels of a terminal depicting the symbols, and the secondary display is a video display attached to the terminal.

22. The method of claim 15, wherein the wagering game is a video slot game, the primary display is a first portion of a video screen at a terminal, and the secondary display is a second portion of the video screen, separate from the first portion.

23. The method of 22, wherein the arrangement of the set of symbols simulates mechanical reels of a mechanical slot machine.

24. The method of claim 15, further comprising:

receiving a payment from the player before determining the arrangement of the set of symbols.

25. The method of claim 15, further comprising:

responsive to displaying the arrangement of the set of symbols associated, awarding a prize to the player.

26. The method of claim 25, wherein the prize determined from a prize structure.

27. The method of claim 25, wherein the prize is dispensed to the player by a dispenser.

28. The method of claim 15, wherein the outcome is determined by a server in communication with a terminal, the terminal including the primary display and the secondary display.

29. The method of claim 28, wherein the server is in communication with the terminal over the Internet.

30. The method of claim 15, wherein displaying the representation of the winning pay line includes displaying the pattern of the winning pay line.

31. The method of claim 15, further comprising displaying a plurality of winning pay lines on the primary display and sequentially displaying a representation of each winning pay line in sequence on the secondary display.

32. A non-transitory computer readable medium including instructions configured to be executed on a processor, so that the processor performs a method comprising the steps of responsive to a player indication of a desire to play the wagering game, determining an arrangement of a set of symbols indicating an outcome and a winning pay line in the arrangement of the set of symbols;

displaying the arrangement of the set of symbols and the winning pay line on a primary display; and responsive to displaying the arrangement of the set of symbols, displaying, on a secondary display and with the processor, a representation of the winning pay line shown in the primary display, the secondary display separate from the primary display.

* * * * *